US006608836B2

(12) United States Patent
Mao et al.

(10) Patent No.: US 6,608,836 B2
(45) Date of Patent: Aug. 19, 2003

(54) METHOD AND APPARATUS FOR EGRESS CHANNEL ARCHITECTURE THAT SUPPORTS PROTECTION WITHIN SONET/SDH BASED NETWORKS

(75) Inventors: Jim Mao, Rohnert Park, CA (US); Wei Wu, Petaluma, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/853,344

(22) Filed: May 10, 2001

(65) Prior Publication Data

US 2002/0167964 A1 Nov. 14, 2002

(51) Int. Cl.[7] .................. H04L 12/28; H04L 12/50; G01R 31/08
(52) U.S. Cl. .................. 370/419; 370/244; 370/374
(58) Field of Search ................ 370/370–380, 370/359, 360, 419, 420, 403–406, 244, 242, 222, 223, 224, 217, 413, 410, 395.31, 395.3, 907–909, 229, 216, 218–225, 386–388

(56) References Cited

U.S. PATENT DOCUMENTS

| 5,065,314 | A | | 11/1991 | Maskovyak | |
|---|---|---|---|---|---|
| 5,428,806 | A | | 6/1995 | Pocrass | |
| 5,596,730 | A | * | 1/1997 | Sekine | 370/419 |
| 5,721,727 | A | * | 2/1998 | Ashi et al. | 370/244 |
| 5,724,352 | A | * | 3/1998 | Cloonan et al. | 370/395 |
| 5,777,874 | A | | 7/1998 | Flood et al. | |
| 5,793,745 | A | * | 8/1998 | Manchester | 370/224 |
| 5,815,489 | A | * | 9/1998 | Takatori et al. | 370/217 |
| 6,226,111 | B1 | * | 5/2001 | Chang et al. | 370/223 |
| 6,229,814 | B1 | | 5/2001 | McMillian et al. | |
| 6,317,439 | B1 | * | 11/2001 | Cardona et al. | 370/503 |
| 6,359,859 | B1 | | 3/2002 | Brolin et al. | |

OTHER PUBLICATIONS

Copy of the PCT Search Report dated Aug. 1, 2002. (2) pages.
Yuanyuan Yang, Nonblocking Broadcast Switching Networks, IEEE Transaction on Computers, vol. 40, No. 9, Sep. 1991 pp. 1005 –1015.
Satoru Ohta and Hiromi Ueda, A Rearrangement Algorithm for Three–Stage Switching Networks, Electronics and Communications in Japan, Part 1, vol. 70, No.9, 1987., pp. 68 –77.

* cited by examiner

Primary Examiner—Hassan Kizou
Assistant Examiner—Hanh Nguyen
(74) Attorney, Agent, or Firm—Blakely, Sokoloff, Taylor & Zafman LLP

(57) ABSTRACT

A channel is described that has a backplane interface unit that selects a signal from a backplane. The backplane interface unit is coupled to a cross connect table that provides an indication where the signal may be found on the backplane. The indication is correlated to a logical label. The logical label is correlated to a frame location that the selected signal is transmitted within.

45 Claims, 8 Drawing Sheets

METHOD AND APPARATUS FOR EGRESS CHANNEL ARCHITECTURE THAT SUPPORTS PROTECTION WITHIN SONET/SDH BASED NETWORKS

FIELD OF THE INVENTION

The field of invention relates generally to communication; and more specifically, to a method and apparatus for an egress channel architecture that supports protection within SONET/SDH based networks.

BACKGROUND

Protection within SONET Networks

Synchronous Optical NETwork (SONET) and Synchronous Digital Hierarchy (SDH) based networks typically emphasize redundancy. That is for example, should a particular network line that couples a pair of nodes within the network fail (or degrade), the network is designed to "switch over" to another network line so that traffic flow is not substantially interrupted. Various types of redundancy may be designed into a SONET network. Some examples are illustrated in the discussion that follows.

FIG. 1 shows a point-to-point perspective. Point to point redundancy focuses on the behavior of a pair of nodes 131, 132 that are coupled together by a plurality of SONET lines $104_1, 104_2, \ldots 104_{x-1}, 104_x$. Although other point-to-point schemes may be possible, common point-to-point schemes typically include 1+1 and 1:N. Both schemes classify a network line as either a working line or a protection line. A working line is deemed as the "active" line that carries the information transported by the network. A protection line serves as a "back-up" for a working line. That is, if a working line fails (or degrades), the protection line is used to carry the working line's traffic.

In a 1+1 scheme, both the working and protection lines simultaneously carry the same traffic. For example, referring to FIG. 1, if line $104_1$ is the working line and line $104_2$ is the protection line; the transmitting node 131 simultaneously transmits the same information on both the working line $104_1$ and the protection line $104_2$. The receiving node 132, during normal operation, "looks to" the working line $104_1$ for incoming traffic and ignores the incoming traffic on the protection line $104_2$. If a failure or degradation of the working line $104_1$ is detected, the receiving node 132 simply "looks to" the protection line $104_2$ for the incoming traffic (rather than the working line $104_1$).

In a 1:N scheme one protection line backs up N working lines (where N is an integer greater than or equal to 1). For example, referring to FIG. 1, lines $104_1$ through $104_{x-1}$ may be established as the working lines while line $104_x$ may be established as the protection line. If any of the working lines $104_1$ through $104_{x-1}$ fail or degrade, the transmitting node 132 sends the traffic of the failed/degraded working line over the protection line $104_x$. The receiving node 132 also "looks to" the protection line $104_x$ for the traffic that would have been sent over the failed/degraded working line prior to its failure/degradation.

FIG. 2 shows a ring perspective. Ring redundancy schemes focus on the behavior of a plurality of nodes 231 through 234 coupled together in a ring. Redundancy is handled by sending identical streams of traffic in opposite directions. A first direction may be referred to as the working direction while a second direction may be referred to as the protection direction. In a Unidirectional Line Switched Ring (ULSR) approach, working traffic is sent in a first direction around the ring (e.g., clockwise) and protection traffic is sent in a second direction around the ring (e.g., counter-clockwise).

In a Bi-directional Path Switched Ring (BPSR), the working traffic flows in the "fastest" direction. That is, of the two directions around the ring from a transmitting node to a receiving node, a first direction will have a shorter propagation delay than a second direction. For each transmitting/receiving node pair, the working traffic corresponds to the direction having the shorter propagation delay and the protection traffic corresponds to the direction having the longer propagation delay. In either the ULSR or BPSR approaches, if failure or degradation occurs in the working direction, active traffic is looked for in the protection direction.

More sophisticated SONET networks may also be designed that provide protection at higher degrees of resolution. That is, each SONET line (such as line $104_1$ of FIG. 1 or line 204 of FIG. 2) may be viewed as transporting a number of STS-1 signals. For example, if lines $104_1$ and 204 each correspond to an STS-n line, each of these lines may be viewed as carrying n STS-1 signals (e.g., an STS-48 line may be viewed as carrying 48 STS-1 signals).

Furthermore, in other environments, each STS-1 signal is used as a resource for carrying a plurality of lower speed signals. Protection may be provided for STS-1 signals individually or for their constituent lower speed signals individually. Either of these forms of protection are commonly referred to as "path protection. For example, in one type of 1+1 path protection scheme, an individual "working" STS-1 signal within an STS-n line (rather than all the STS-1 signals on the STS-n line) is backed up by a "protection" STS-1 signal transported on another STS-n line.

Automatic Protection Switching (APS) is a protocol that may be executed by the nodes within a SONET network. APS allows SONET nodes to communicate and organize the switching over from their working configuration to a protection configuration in light of a failure or degradation event. For example, in a typical approach, K1 and K2 bytes are embedded within the SONET frame that is communicated between a pair of nodes in order to communicate failure/degradation events, requests for a switch over, etc.

Distributed Switch Architecture

FIG. 3 shows a distributed "full mesh" switch architecture 331. The architecture 331 of FIG. 3 may be utilized to implement a SONET node such as nodes 131, 132 of FIG. 1 or nodes 231 through 234 of FIG. 2. An ingress channel receives incoming data from a networking line. FIG. 3 shows ingress channels $301_1$ through $301_x$ that each receive incoming data on a respective network line $303_1$ through $303_x$.

An egress channel transmits outgoing data onto a networking line. FIG. 3 shows egress channels $312_1$ through $312_x$ that each transmit outgoing data on a respective network line $304_1$ through $304_x$. In a full mesh architecture, each ingress channel $301_1$ through $301_x$ transmits all of its ingress traffic to each egress channel $312_1$ through $312_x$. For example, referring to FIG. 3, ingress channel $301_1$ receives n STS-1 signals from its corresponding network line $303_1$ (e.g., if network line $303_1$ is an OC-48 line; n=48 and the ingress line channel receives 48 STS-1 signals).

All n of the STS-1 signals received by the ingress channel $301_1$ are transmitted across the node's backplane 305 over each of its output lines 306, 310, 311, 312. As a result, each egress channel $312_1$ through $312_x$ receives all n STS-1 signals received by ingress channel $303_1$. In one approach, each STS-1 signal is provided its own signal line to each egress channel. As a result, each output 306, 310, 311, 312 corresponds to a n-wide bus.

As each ingress channel is similarly designed, each egress channel $312_1$ through $312_x$ receives all the incoming traffic received by the node. For example, in the particular example of FIG. 3, there are x ingress channels $301_1$ through $301_x$ that each receive n STS-1 signal. As such, each egress channel $312_1$ through $312_x$ receives xn STS-1 signals (which correspond to the total amount of traffic received by the node 331).

For example, note that egress channel $312_1$ receives inputs 306 through 309 where each of these inputs correspond to the n STS-1 signals received by their corresponding ingress channel (i.e., input 306 for ingress channel $301_1$, input 307 for ingress channel $301_2$, input 308 for ingress channel $301_3$, ... and input 309 for ingress channel $301_x$). In order to implement the switching fabric of the node, each egress channel $312_1$ through $312_x$ is configured to select n of the xn STS-1 signals and transmit the n STS-1 signals over its corresponding outgoing networking line $304_1$ through $304_x$.

BRIEF DESCRIPTION OF THE DRAWINGS

The present invention is illustrated by way of example, and not limitation, in the Figures of the accompanying drawings in which.

DETAILED DESCRIPTION

A channel is described that has a backplane interface unit that selects a signal from a backplane. The backplane interface unit is coupled to a cross connect table that provides an indication where the signal may be found on the backplane. The indication is correlated to a logical label. The logical label is correlated to a frame location that the selected signal is transmitted within. Other appratti as well as related methods are described in more detail below.

Egress Channel Architecture

Figure 1:
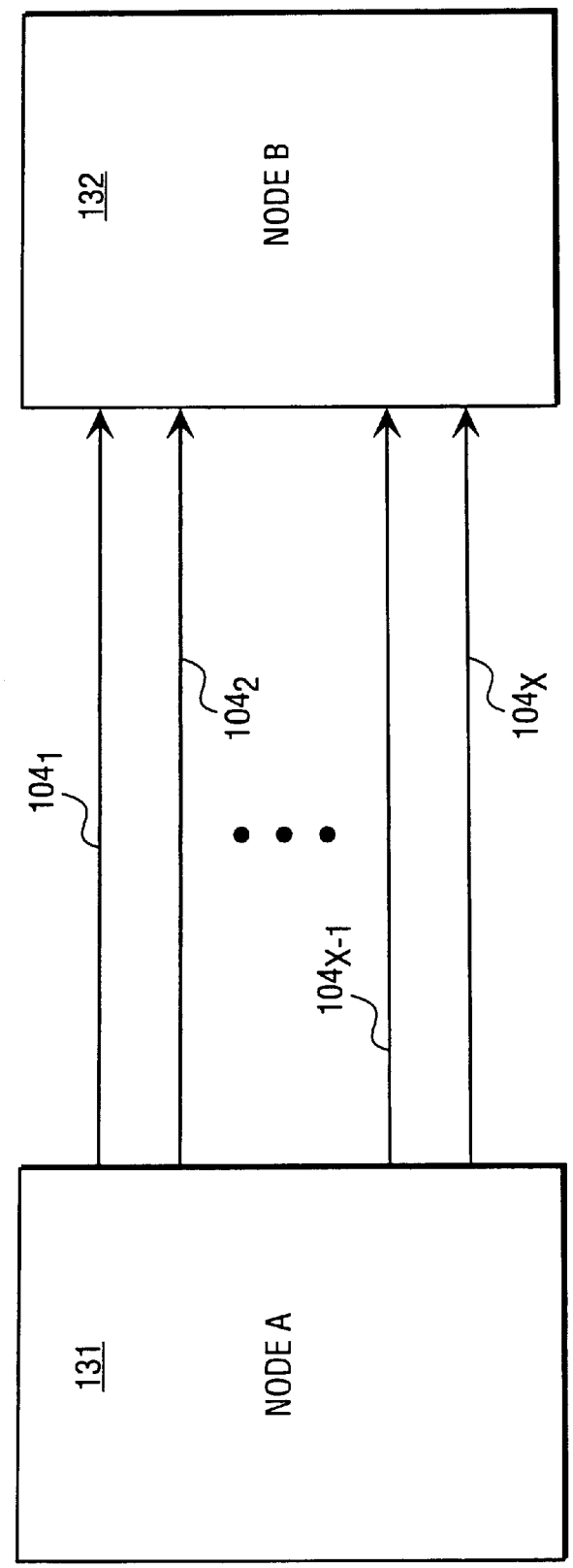
FIG. 1 shows a point to point SONET networking perspective.
Figure 2:
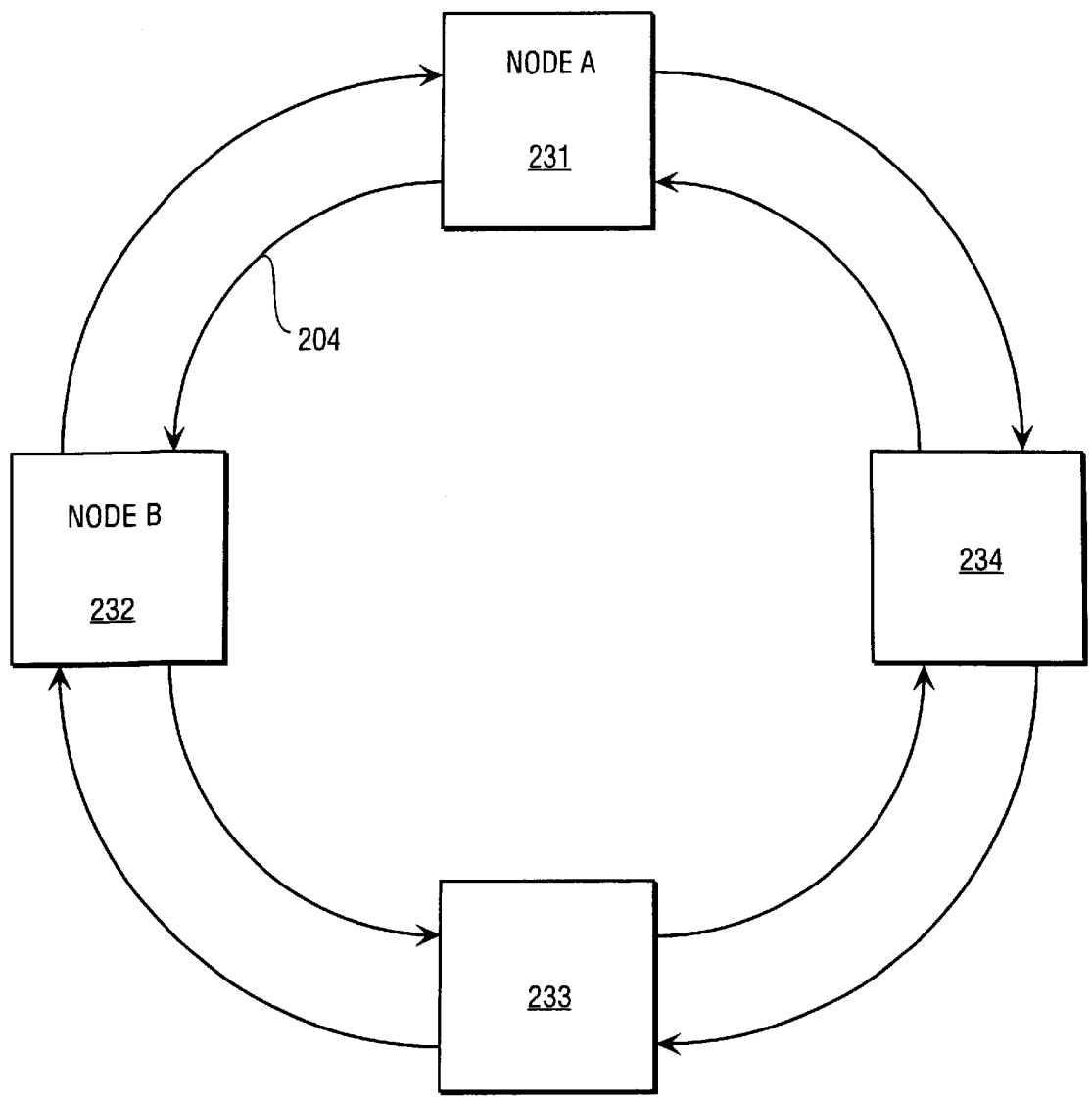
FIG. 2 shows a ring SONET networking perspective.
Figure 3:
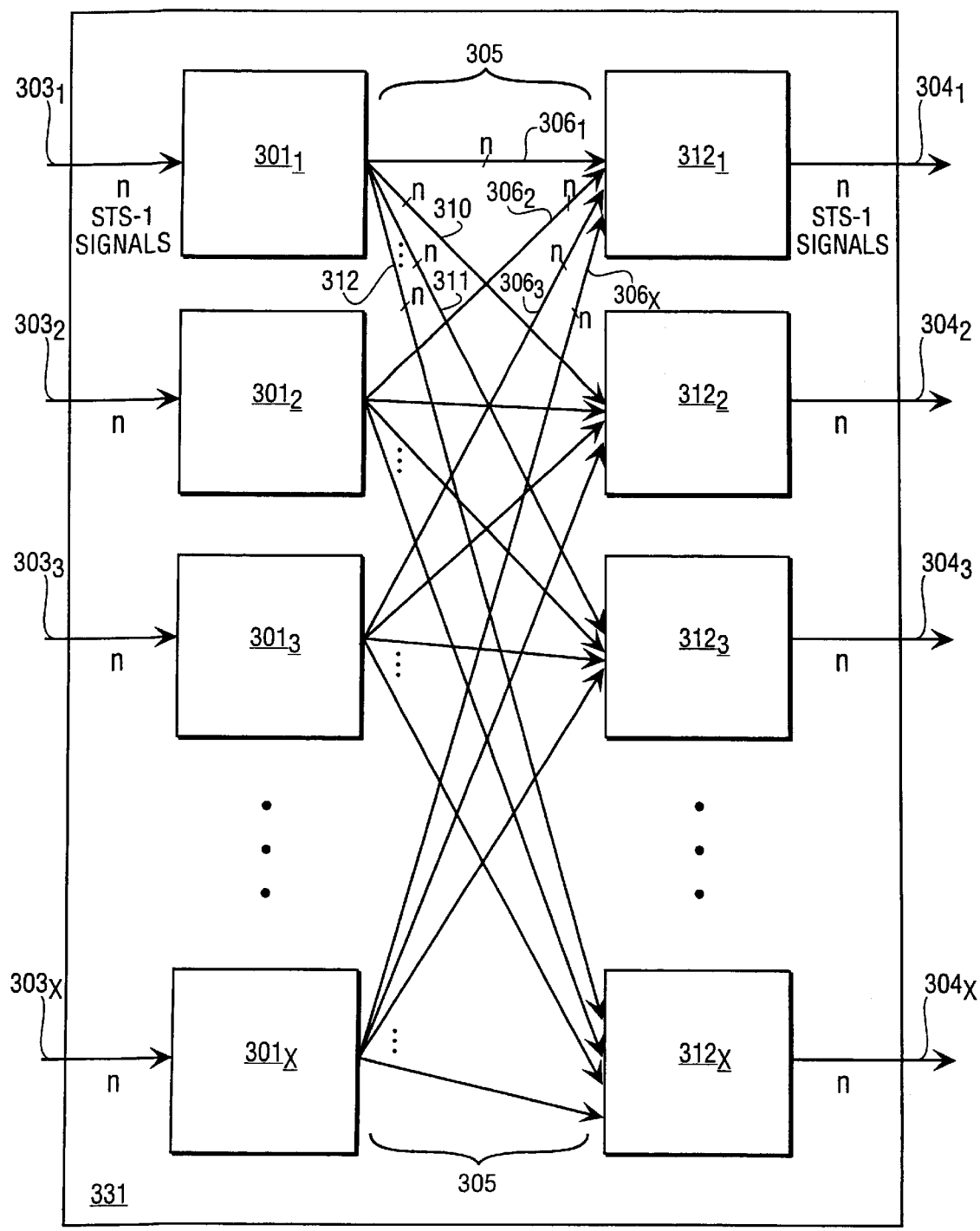
FIG. 3 shows a full mesh distributed switch architecture.
Figure 4:
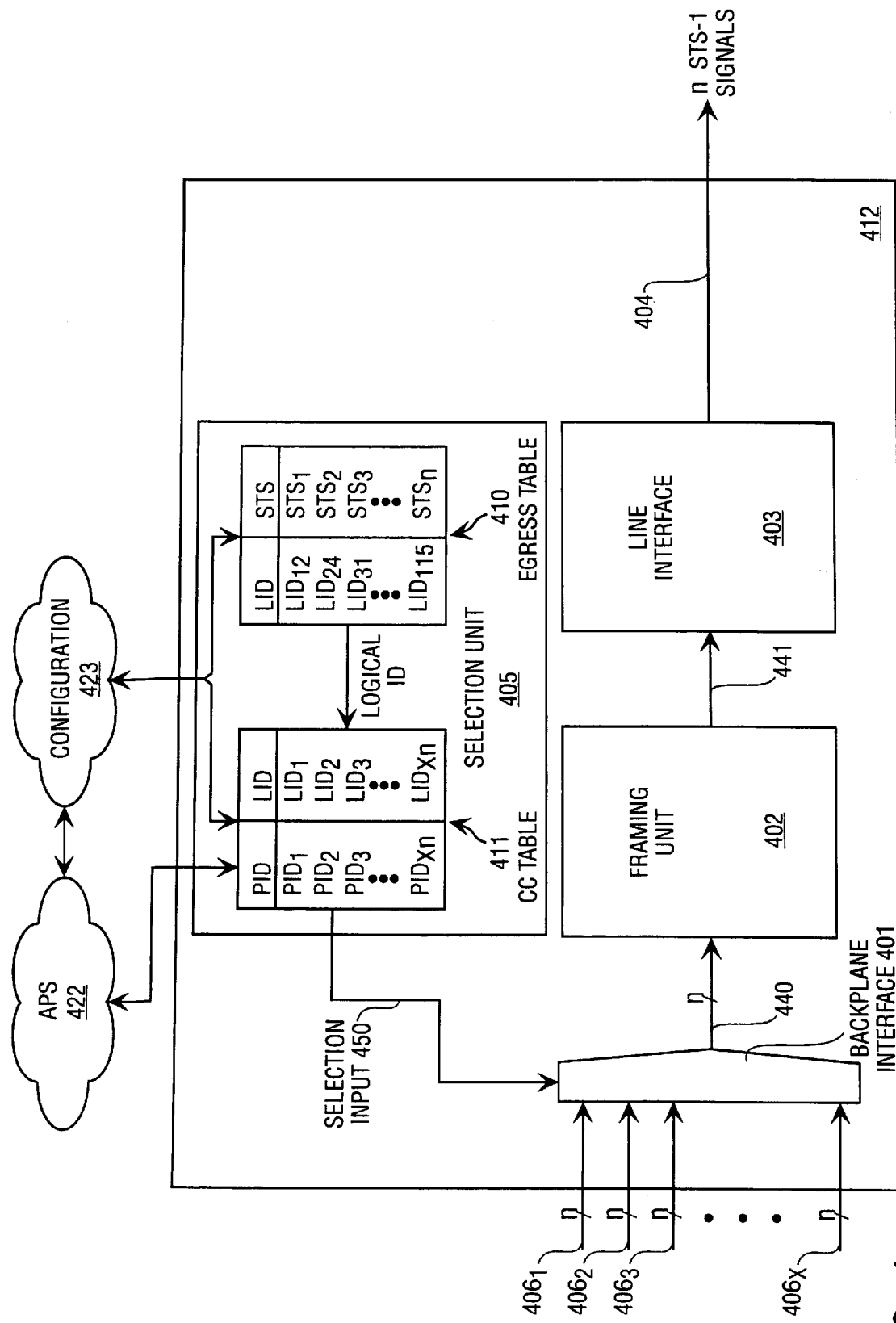
FIG. 4 shows an embodiment of an egress channel.

A SONET node architecture that supports a wide selection of different redundancy schemes provides customers with a wide variety of protection options. FIG. 4 shows an embodiment 412 of an egress channel that at least supports 1+1, 1:N, UPSR and BLSR based redundancy schemes. The egress channel 412 of FIG. 4 may be used within the full mesh distributed switch architecture as described with respect to FIG. 3.

Note that STS signals are electrical while OC signals are optical. For the sake of simplicity, the term STS is used throughout the following description although the teachings relate to both OC signals and STS signals. Furthermore, outside the United States, SDM signals are used within SDH frames (rather than STS signals within SONET frames). Again, for the sake of simplicity, the term STS is used throughout the following description even though the teachings apply to either STS signals or SDM signals (as well as SDH frames or SONET frames).

In the egress channel embodiment 412 of FIG. 4, the backplane interface unit 401 receives a plurality of STS-1 signals from the node's backplane. For example, if the egress channel embodiment 412 of FIG. 4 is implemented as the egress channel 312 of FIG. 3, inputs $406_1$ through $406_x$ of FIG. 4 correspond to inputs $306_1$ through $306_x$ of FIG. 3. As such, in such an application, the backplane interface unit 401 receives all xn STS-1 signals received by the node.

Of these xn STS-1 signals, the backplane interface unit 401 may select up to n STS-1 signals for transmission over the outbound network line 404. As such, up to n STS-1 signals may be presented at the output 440 of the backplane interface unit 401. The framing unit 402 places each STS-1 signal selected by the backplane interface unit into a location within a SONET frame. Alternatively, the framing unit 402 provides SDH framing for an STM-1 signal. Further still, the backplane signals may corresponds to STS-N or STM-N signals where N is greater than 1. The line interface unit 403 transmits the framed, selected STS-1 signals over the outbound network line 404.

The line interface unit 403 may include an optic or electrical transmitter depending on whether the outbound network line 404 is an optical or electrical cable. Note that the outbound network line 404 may be implemented with a plurality of outbound network lines in a "striped" fashion. For example, an OC-48 outbound network line 404 may actually be implemented with four OC-12 outbound network lines. Thus, in various embodiments, the line interface unit 403 and the framing unit 402 may be designed to distribute the traffic from the backplane over a plurality of outbound lines.

Data provided on the selection input 450 determines which of the xn STS-1 signals are selected by the backplane interface unit 401 for transmission over outbound network line 404. In the embodiment of FIG. 4, physical identification (PID) values are presented to the backplane interface unit 401 so that the appropriate STS-1 signals are selected. For example a unique PID value may be configured for each STS-1 signal presented to the backplane interface unit. Each PID value indicates where its corresponding STS-1 signal may be found on the backplane.

For example, the backplane may be designed to correlate each ingress STS-1 signal with the particular ingress channel and SONET frame location it arrived on. With such a design point, a particular backplane location or connection (e.g., a pin that an egress line card mates to) may be identified with a particular ingress STS-1 signal. For example, a first STS-1 signal may be directed to a first backplane pin that an egress line card mates to, a second STS-1 signal may be directed to a second backplane pin that an egress line card mates to, etc.

In one embodiment, the selection input 450 corresponds to a data bus that can hold up to n PID values; and, the backplane interface unit 401 is configured to provide the corresponding STS-1 signal at its output 440 for each PID value it receives. As such, the appropriate STS-1 signals are presented to the framing unit 401 by feeding the selection input 450 with the appropriate PID values.

In an embodiment, each PID value has two components that reflect the source of the STS-1 signal to which the PID value refers. For example, a first component may reflect which backplane card slot the ingress channel that received the STS-1 signal is "plugged into"; and, a second component may reflect which location within the incoming SONET frame structure (e.g., as it exists on the incoming network line such as incoming network line $303_1$ of FIG. 3) that the STS-1 signal is being received within.

As an example of such a PID strategy, if a node is designed to handle a maximum of twenty four line cards that each can provide a maximum of forty eight ingress STS-1 signals—then the node may be configured to have 1152 different PID values. Each PID value may be configured to have a first component that is five bits wide (so that the full range of twenty four line card slots can be uniquely expressed) and a second component that is six bits wide (so that the full range of forty eight ingress STS-1 signals can be uniquely expressed).

As seen in the egress channel embodiment of FIG. 4, the PID values are listed within a cross connect table 411 that is associated with a selection unit 405. The selection unit 405 is responsible for providing the appropriate PID values along the selection input 450 in response to configuration commands provided by the node's APS function 422 and the node's Configuration function 423. The APS function 422, as described in the background, controls the "switch over" from working resources to protection resources in the event of a failure or degradation event.

The Configuration function 423 establishes the switching fabric of the node (e.g., establishes which egress STS-1 signal a particular ingress STS-1 signal is converted into). Both the APS 422 and Configuration 423 functions are typically implemented in software and are shown as different functions in FIG. 4 (however, in other embodiments, they may be combined together and viewed as a single function). The APS 422 and Configuration functions 423 may be distributed (e.g., executed upon a plurality of line cards) or centralized (e.g., executed upon a "motherboard" that plugs into the node's backplane and is communicatively coupled to each line card in the node so that configuration/APS commands may be directed to them).

A more detailed explanation of an embodiment of how the APS and Configuration functions 422, through manipulation of the selection unit 405, may control which STS-1 signals are selected from the backplane interface unit 401 is described immediately below. The egress channel embodiment 412 of FIG. 4 is designed according to the following perspective: 1) a unique physical ID (PID), as described above, is established for each ingress STS-1 signal of the node; and 2) a unique logical ID (LID) is established for each egress STS-1 signal of the node.

By correlating a PID to an LID, a component of the node's switching fabric is established. That is, the correlation of a particular PID to a particular LID corresponds to a description of the conversion of a particular ingress STS-1 signal to a particular egress STS-1 signal. A full description of the node's switching fabric may be created by establishing a PID/LID value for each ingress STS-1 signal received by the node.

In the egress channel embodiment 412 of FIG. 4, the cross connect (CC) table 411 of FIG. 4 corresponds to such a description. That is, CC table 411 of FIG. 4 provides a complete listing of the PID/LID correlation for each STS-1 signal that is switched by the node. In an embodiment, the CC table 411 is implemented as a "look-up" table that provides an output PID value (along the selection input 450) for each input LID presented to the table 411.

As already described above, a plurality of output PID values are provided to the backplane interface unit 401 so that the appropriate STS-1 signals are selected for transmission over outbound transmission line 404. As such, a plurality of corresponding LID values are provided to the CC table 411 as a look-up input parameter.

Recall that a unique LID value is established for each of the node's egress STS-1 signals. As the egress channel 412 embodiment of FIG. 4 can handle the transmission of n such egress STS-1 signals, egress table 410 corresponds to a correlation of the LID value provided to each of the egress STS-1 signals transmitted by the egress channel 412. That is, in the exemplary embodiment of FIG. 4, the framing unit 402 can provide framing for a maximum number of "n" egress STS-1 signals.

As such, if the full capacity of the framing unit 402 is to be utilized, the right hand side of the egress table 410 corresponds to a listing (e.g., $STS_1$, $STS_2$, $STS_3$, ... $STS_n$) of each framing location that may be crafted by the framing unit 402. As each of these framing locations corresponds to an egress STS-1 signal, each are provided with a unique LID value (e.g., $LID_{12}$, $LID_{24}$, $LID_{31}$, ... $LID_{115}$). Furthermore, as the CC table 411 corresponds to a full description of the node's switch fabric, the presentation to the CC table 411 of each LID value within the egress table 410 (as an input parameter for a look up) will provide the proper selection of STS-1 signals for framing by the framing unit 402.

During a configuration mode, the Configuration function 423 configures the contents of the CC table 411 and the egress table 410. By configuring an egress table within each egress channel within a node, the Configuration function 423 effectively describes which STS-1 egress signals are to be transmitted from which egress line card.

Furthermore, by configuring the CC table 410, the Configuration function 423 effectively describes the conversion of each ingress STS-1 signal into its corresponding egress STS-1 signal (which effectively describes the node's switching fabric). As the Configuration function 423 is able to configure both the CC table 410 and the egress table 411, note that FIG. 4 indicates that the Configuration function is coupled to both of these tables.

Figure 5:
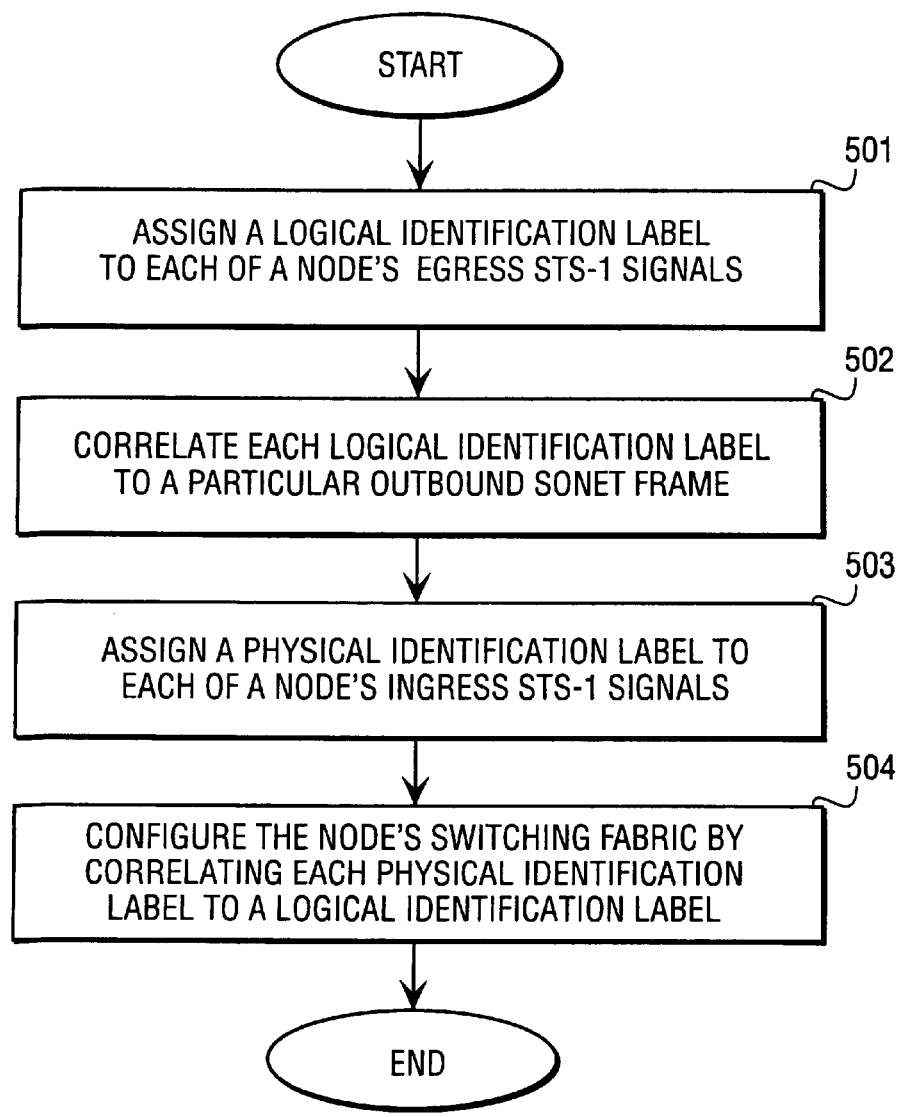
FIG. 5 shows a configuration methodology for a node that utilizes the egress channel design of FIG. 4.

FIG. 5 shows an embodiment of a configuration methodology 500 that corresponds to the description provided just above. That is, as described above, a logical identification label (LID) is assigned 501 to each of a node's egress STS-1 signals. Each of the logical identification labels are also correlated 502 to a particular outbound SONET frame and SONET frame location. An embodiment of processes 501 and 502 includes configuring the egress table 410 of Figure for each egress channel within the node. This activity corresponds to defining the outbound networking line and the SONET frame location for each egress STS-1 signal that is transmitted by the node.

Once the node's egress STS-1 signals have been defined as described above, a physical identification label (PID) is assigned 503 to each of a node's ingress STS-1 signals. The node's switching fabric is then configured 504 by correlating each physical identification label to a logical identification label. That is, the conversion of each ingress STS-1 signal into an egress STS-1 signal has been mapped. An embodiment of processes 503 and 504 includes configuring the CC table 411 of FIG. 4.

Protection Implementation

Figure 6:
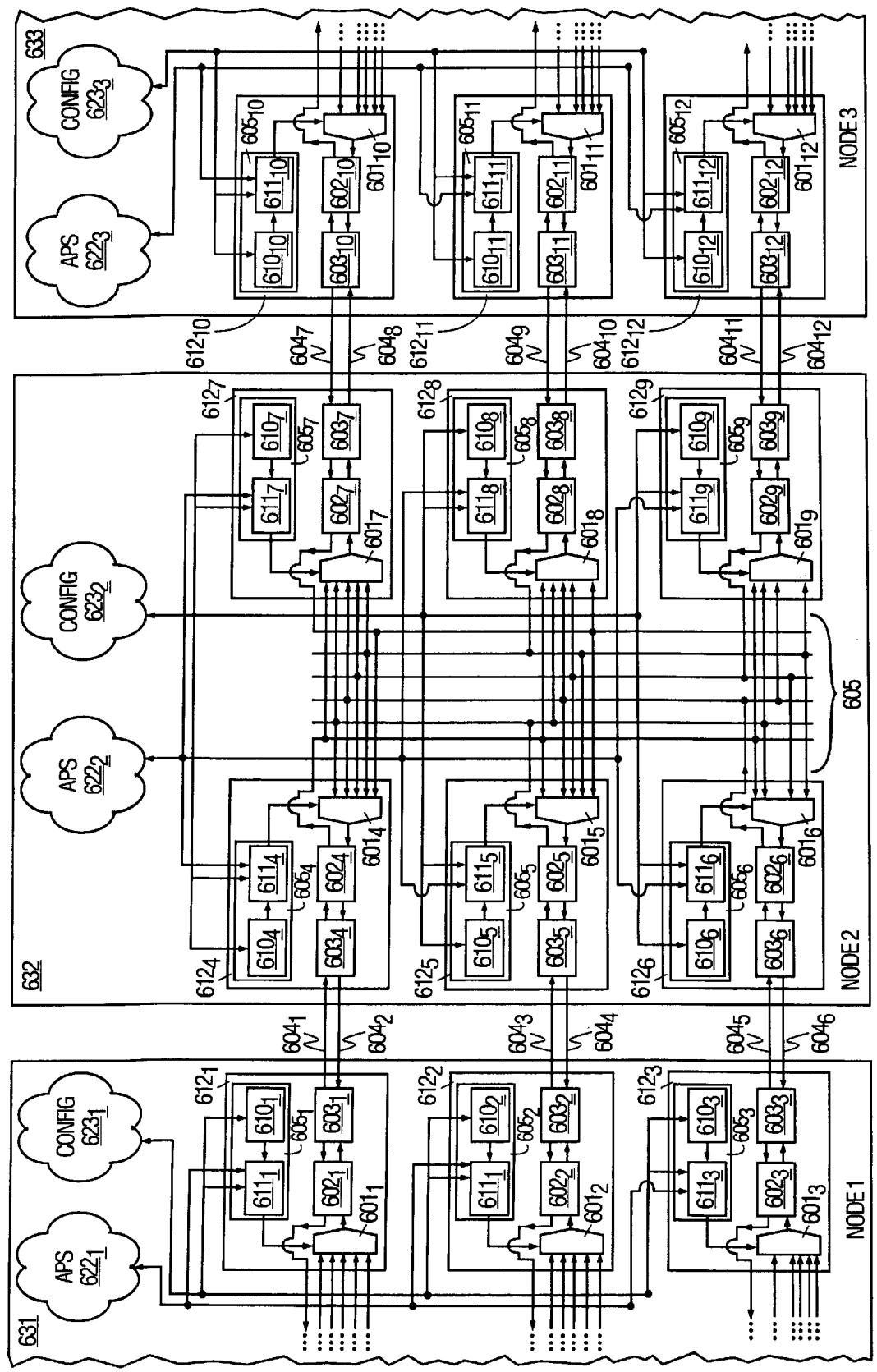
FIG. 6 shows a trio of nodes that each utilize the egress channel design of FIG. 4.

The egress channel architecture 412 of FIG. 4 also allows for easy implementation of the various protection schemes that are discussed in the background. FIG. 6 shows an exemplary implementation of a trio of nodes 631, 632 and 633. Nodes 631 and 632 are communicatively coupled by networking lines $604_1$ through $604_6$. Nodes 632 and 633 are communicatively coupled by networking lines $604_1$ through $604_6$. Notice that the nodes 631, 632 and 633 of FIG. 6 utilize the egress channel architecture 412 of FIG. 4.

That is, referring to FIG. 4 and FIG. 6: 1) each of units $601_x$ of FIG. 6 (i.e., units $601_1$ through $601_{12}$) correspond to the backplane interface unit 401 of FIG. 4; 2) each of units $602_x$ of FIG. 6 (i.e., units $602_1$ through $602_{12}$) correspond to the framing unit 402 of FIG. 4; 3) each of units $603_x$ of FIG. 6 (i.e., units $603_1$ through $603_{12}$) correspond to the line interface unit 403 of FIG. 4; 4) each of units $611_x$ of FIG. 6 (i.e., units $611_1$ through $611_{12}$) correspond to the cross connect table 411 of FIG. 4; and 5) each of units $610_x$ of FIG. 6 (i.e., units $610_1$ through $610_{12}$) correspond to the egress table 410 of FIG. 4.

Within FIG. 6: 1) line cards $612_1$ through $612_3$ are "plugged into" the backplane of node 631; 2) line cards $612_4$ through $612_9$ are "plugged into" the backplane 605 of node 632; and 3) line cards $612_{10}$ through $612_{12}$ are "plugged into" the backplane of node 633. The backplane structure of nodes 631 and 633 (as well as other line cards that may be plugged into these backplane structures) are not shown in FIG. 6 for convenience.

Note that there is a distinction between a line card and a channel. A line card is a card that can be coupled to a network line. A channel is a data path within a line card that handles traffic flow in a particular direction (e.g., ingress or egress). As such, a line card having both ingress and egress connectivity (such as line cards $612_1$ through $612_{12}$ of FIG. 6) will have both an ingress channel and an egress channel. Thus referring briefly back to FIG. 3 and recalling its discussion, for example, the ingress channel $301_1$ and egress channel $312_1$ may coexist upon the same line card.

The ingress and egress channels of a single line card may be drawn to be overlapping as seen in FIG. 6. Specifically, for convenience, the framing units $602_1$ through $602_{12}$ of FIG. 6 and the line interface units $603_1$ through $603_{12}$ of FIG. 6 are drawn as having both ingress and egress functionality. Note that, similar to the discussion provided above with respect to FIG. 4 and the striping of a plurality of network lines, the line interface units $603_1$ through $603_{12}$ and framing units $602_1$ through $602_{12}$ may be designed to handle a plurality of ingress lines.

As such, as seen in FIG. 6, each framing unit $602_1$ through $602_{12}$ and each line interface unit $603_1$ through $603_{12}$ has an ingress input and output as well as an egress input and output. The exemplary implementation of FIG. 6 will be used in the discussion that follows to demonstrate examples of 1+1, 1:N, BLSR and UPSR redundancy schemes that are implemented with the egress channel architecture 412 of FIG. 4.

As an example of 1+1 protection, assume network line $604_1$ and network line $604_3$ correspond to a 1+1 protection scheme that is established for traffic flowing to the right (as seen in FIG. 6) between nodes 631 and 632. Specifically, assume that network line $604_1$ corresponds to the working network line and that network line $604_3$ corresponds to the protection network line.

In an embodiment where node 632 acts as a simple repeater, the 1+1 protection scheme between nodes 631 and 632 may be repeated between nodes 632 and 633. That is, the working traffic received by node 632 on working network line $604_1$ is retransmitted as working traffic on network working line $604_7$. Similarly, the protection traffic received by node 632 on protection network line $604_3$ is retransmitted as protection traffic on networking line $604_{10}$.

In order to implement this configuration, the Configuration function $623_2$ of node 632 configures the CC table $611_7$ and egress table $610_7$ of line card $612_7$ such that its corresponding backplane interface unit $601_7$ selects each ingress STS-1 signal received by line card $612_4$. Similarly, the Configuration function $623_2$ of node 632 also configures the CC table $611_{10}$ and egress table $610_{10}$ of line card $612_{10}$ such that its corresponding backplane interface unit $601_{10}$ selects each ingress STS-1 signal received by line card $612_5$.

Note that all the CC tables within a node (e.g., CC tables $611_1$ through $611_3$ within node 631 and CC tables $611_4$ through $611_9$ within node 632) may be identically maintained through a node. Thus, a change to a CC table within a particular line card (such as the change described just above with respect to CC table $611_7$ and line card $612_7$) may be accompanied by an identical change to all the other CC tables within the node. As such, each line card maintains an updated "copy" of the node's switching fabric.

Continuing then, if the working network line $604_1$ between nodes 631 and 632 suffers a failure or degradation event, the APS function $622_2$ of node 632 changes the CC table $611_7$ of line card $612_7$ such that its corresponding backplane interface unit $601_7$ selects each STS-1 signal received by line card $612_5$ rather than line card $612_4$. As the LID values provided by the egress table $610_7$ remain unchanged, the node 632 will "switch" from working traffic to protection traffic by replacing (within the CC table $611_7$) the original PID values (that corresponded to the ingress STS-1 signals received by line card $612_4$) with PID values that correspond to the ingress STS-1 signals received by line card $612_5$.

The APS function $622_2$ of node 632 may then engage in communication with the APS function $622_1$ of node 631 (e.g., via the exchange of K bytes) to establish another active line between the two nodes 631, 632. For example, the pair of APS functions $622_1$, $622_2$ may agree that network line $604_5$ should be utilized as the protection line for new working line $604_3$.

As such, APS function $622_2$ configures the CC table $611_3$ of line card $612_3$ (e.g., by replacing PID values as described above) such that its backplane interface unit $601_3$ selects the ingress STS-1 signals (relative to node 631) that were originally selected by the backplane interface unit $601_1$ of line card $612_1$ before the failure/degradation of line $604_1$. In a similar manner, the APS function $622_2$ of node 632 may reconfigure the CC table $611_8$ of line card $612_8$ so that its backplane interface unit $601_8$ selects the STS-1 signals now being received at line card $612_6$.

As an example of 1:N protection where node 632 acts as a repeater, assume network lines $604_1$, $604_2$ and $604_3$ correspond to a 1:N protection scheme that is established for traffic flowing to the right (as seen in FIG. 6) between nodes 631 and 632. Specifically, assume that network lines $604_1$ and $604_2$ correspond to working network lines and that network line $604_3$ corresponds to the protection network line.

If either of the working lines $604_1$ and $604_2$ suffer a failure or degradation event, the APS function $622_1$ of node 631 reconfigures the CC table $611_3$ of line card $612_3$ so that the STS-1 signals originally carried by the failed/degraded working line begin to be carried on the protection line $604_5$. Similarly, the APS function $622_2$ of node 632 reconfigures its CC tables so that the ingress STS-1 signals originally received on the failed/degraded working line begin to be selected from line card 612₆ (in order to implement their conversion into an egress STS-1 signal from node 632) rather than line card 612₄ or line card 612₅.

As an example of UPSR or BLSR protection where node 632 acts as a repeater, network lines 604₁, 604₄, 604₈ and 604₉ may correspond to links in a ring protection scheme for nodes 631, 632 and 633. Specifically, as an example, network lines 604₁ and 604₈ may correspond to a working direction while network lines 604₉ and 604₄ correspond to a protection direction. As such, the CC tables of node 632 are set such that line card 612₇ re-transmits the STS-1 signals received on line card 612₄; and, line card 612₅ re-transmits the STS-1 signals received on line card 612₈.

Recall from the background that a form of path protection includes the ability to provide protection for STS-1 signals on an individual basis rather than de facto protection for all the STS-1 signals that exist on a particular line. The egress channel architecture 412, 612 observed in FIGS. 4 and 6 allows for path protection as described above. For example, a "path" level protection line card may be created by configuring its corresponding CC table to select certain STS-1 signals even though their corresponding working STS-1 signals are transmitted on different outbound transmission lines. That is, a first protection STS-1 signal is selected and a second protection STS-1 signal is selected where their corresponding working STS-1 signals are transmitted from the node as working traffic on different outbound network lines.

Figure 7:
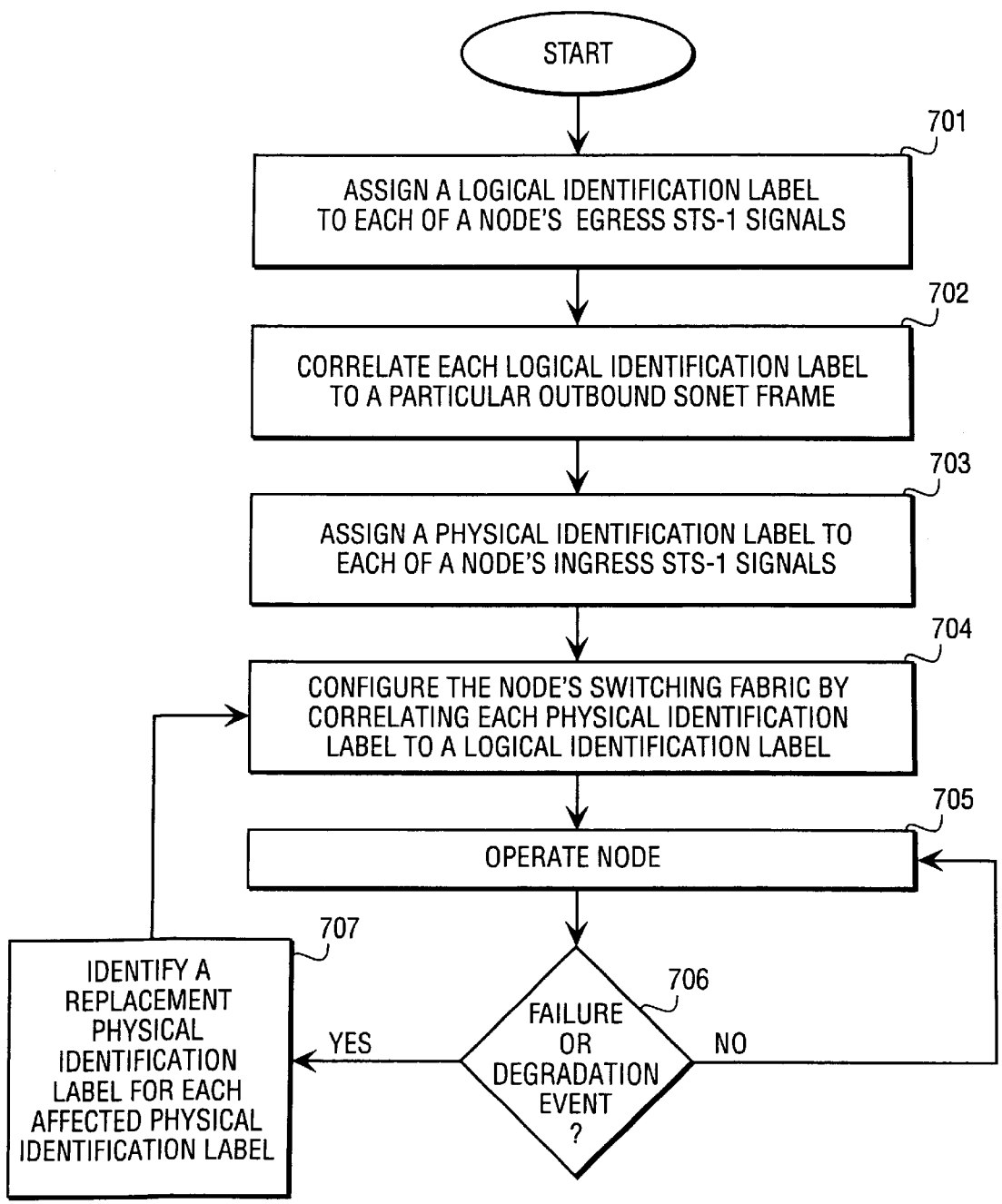
FIG. 7 shows a methodology for implementing protection within a SONET network.

FIG. 7 shows a methodology 700 that encompasses various embodiments (such as those discussed just above with respect to FIG. 6) that relate to "switching over" from a working resource to a protection resource in light of a failure or degradation event. Note that the initial sequences 701, 702, 703, 704 of the methodology 700 of FIG. 7 correspond to the configuration methodology 500 originally presented in FIG. 5.

As such, following the initial configuration of a node, the node operates 705 (i.e., actively switches or routes ingress signals into egress signals). If a failure or degradation event 706 does not occur, the node continues to operate 705. However, upon the detection of a line failure or degradation event 706, a replacement physical identification (PID) label is found 707 for each affected PID. An affected PID corresponds to a PID that describes an ingress signal who has suffered the failure or degradation event.

For example, if working line 604₁ of FIG. 6 suffers a failure, each of the ingress signals being received at line card 612₄ are affected. As a result, the PID values that correspond to these affected ingress signals may be referred to as affected PID values. Recall from the various recovery examples provided above with respect to FIG. 6 that protection traffic effectively replaced working traffic by replacing the affected PID values (within a CC table) with new PID values that corresponded to the source of the protection traffic. Such an activity therefore corresponds to an embodiment of the activity represented by sequences 707 and 704 in FIG. 7.

Note that the logical identification (LID) values may be viewed as permanent or at least quasi-permanent in the sense that a failure or degradation event may be recovered from without implementing a change to any LID value. This is consistent with the fact that each LID value corresponds to a label for each egress signal that the node has been configured to provide resources for. A failure or degradation event does not change the fact that the node has been configured to provide a certain number of egress signals. As such, changes in LID values are typically unwarranted in light of such an event.

Figure 8:
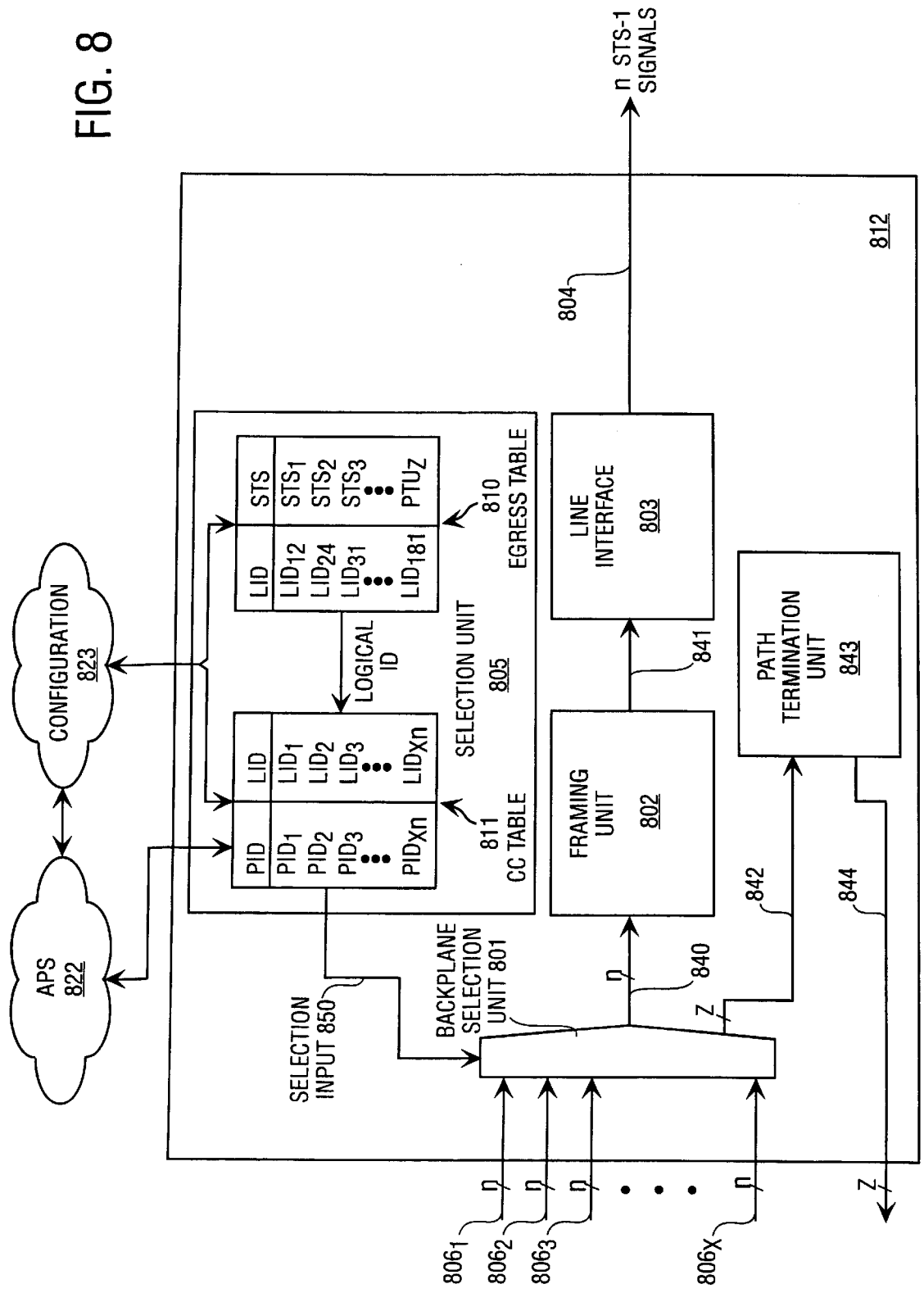
FIG. 8 shows an embodiment of an egress channel having path termination.

It is important to point out that other embodiments relating to the design approach discussed herein are possible. For example, the line card design approach of FIG. 6 may be extended to include Internet Protocol (IP) routing functionality. FIG. 8 shows an example. In the embodiment 812 of FIG. 8, the backplane selection unit 801 provides a first output 840 to a framing unit 802 as well as a second output 842 to a path termination unit 843.

In an embodiment, the path termination unit 843 includes cell assembly/reassembly and/or other path termination related functions so that an STS-1 signal interface is maintained at the second output 842 and the path termination unit output 844. In a further embodiment, the path termination unit 843 may be configured to include Internet Protocol (IP) routing or switching. Typically, STS-1 signals leaving the path termination unit 843 are selected by another line card from the backplane for conversion into an egress signal.

Path termination and/or IP switching/routing may add another dimension to the logical identification (LID) strategy. For example, the egress table 810 and CC table 811 may be expanded to include unique LID values for those STS-1 signals destined for the framing unit 802 as well as those STS-1 signals destined for the path termination unit 843. The LID values may also be configured with a header or other sub-component that identifies whether the referenced signal should be provided at the first output 840 or the second output 842.

Referring to the embodiments 412, 812 of FIGS. 4 and 8, note that a table (such as tables 410, 411 and 610, 611) may be implemented with a memory, register, or other data storage device. Furthermore, tables 410, 411 and 610, 611 may be viewed as any form of correlation between the enlisted entries. For example, egress table 410, 610 does not need to be implemented as a "look-up" table. Egress table 410, 610 may be embodied in any way that establishes correlation between a particular outbound frame location and a label (e.g., the LID) that identifies an egress signal.

For example, in an embodiment, the framing unit 402, 802 has a unique input for each STS-1 signal that is to be framed by the framing unit 402, 802. If LID values are provided to the CC table (e.g., where the LID value is obtained by means other than a look-up operation) that control which backplane signal is offered to which framer unit input, the sought for correlation has been established.

What is claimed is:

1. An apparatus, comprising:
   a channel having a backplane interface unit that selects a signal from a backplane, said backplane interface unit coupled to a cross connect table that provides an indication where said signal may be found on said backplane, said indication correlated to a logical label, said logical label correlated to a frame location that said selected signal is transmitted within, said logical label having a value:
   1) that will remain fixed during the course of recovery from a failure or degradation event that affects said signal; and,
   2) that is reserved for said frame location so as to identify said frame location.

2. The apparatus of claim 1 further comprising a framing unit that is coupled to an output of said backplane interface unit, said framing unit to provide said frame location for said selected signal.

3. The apparatus of claim 2 further comprising a line interface unit having an input that is coupled to an output of said framing unit.

4. The apparatus of claim 3 wherein said line interface unit further comprises an optical transmitter.

5. The apparatus of claim 3 wherein said line interface unit has an output coupled to a networking line.

6. The apparatus of claim 1 wherein said signal is an STS-1 signal.

7. The apparatus of claim 1 wherein said signal is an STM-1 signal.

8. The apparatus of claim 1 wherein said backplane is a full mesh backplane.

9. A method, comprising:
   a) assigning a logical identification label to a location within an outbound frame that transports an egress signal, said logical identification label having a value that is reserved for said outbound frame location so as to identify said outbound frame location, and, assigning a physical identification label to a location on a backplane where an ingress signal is found; and,
   b) configuring a portion of a node's switching fabric by correlating said logical identification label to said physical identification label, said logical identification label having a value that will remain fixed during the course of recovery from a failure or degradation event that affects said ingress signal.

10. The method of claim 9 wherein said configuring further comprises updating entries within a cross connect table.

11. The method of claim 9 wherein said configuring is executed by a node's configuration software.

12. The method of claim 9 wherein said signal is an STS-1 signal.

13. The method of claim 9 wherein said signal is an STM-1 signal.

14. The method of claim 9 wherein said backplane is a full mesh backplane.

15. The method of claim 9 further comprising operating said node by converting said ingress signal into said egress signal.

16. A method, comprising:
   a) assigning a logical identification label to a location within an outbound frame that transports an egress signal, said logical identification label having a value that is reserved for said outbound frame location so as to identify said outbound frame location, and, assigning a physical identification label to a location on a backplane where an ingress signal is found;
   b) configuring a portion of a node's switching fabric by correlating said logical identification label to said physical identification label;
   c) operating said node by converting said ingress signal into said gress signal; and,
   d) changing said correlation, in response to a networking line failure or degradation event, by replacing said physical identification label with a second physical identification label while keeping said logical identification label unchanged.

17. The method of claim 16 wherein said second physical identification label corresponds to a location on said backplane where a second ingress signal is found, said second ingress signal a protection signal to said ingress signal.

18. The method of claim 17 wherein said ingress signal and said second ingress signal are received as part of a 1+1 protection scheme.

19. The method of claim 17 wherein said ingress signal and said second ingress signal are received as part of a 1:N protection scheme.

20. The method of claim 16 wherein said second physical identification label corresponds to a second location on said backplane where a second ingress signal is found, said changing causing the transmission of second egress signal within said location, said second ingress signal a duplicate of a signal on said failed or degraded networking line, said second ingress signal converted to said second egress signal.

21. The method of claim 20 wherein said egress signal and said second egress signal are transmitted as part of a 1:N protection scheme.

22. An apparatus, comprising:
   a network node having a backplane and a line card, said line card having an egress channel with a backplane interface unit that selects a signal from said backplane, said backplane interface unit coupled to a cross connect table that provides an indication where said signal may be found on said backplane, said cross connect table correlating said indication to a logical label, said logical label correlated to a frame location that said selected signal is transmitted within, said logical label having a value that:
   1) will remain fixed over the course of recovery from a degradation or failure event that affects said signal and
   2) that is reserved for said frame location so as to identify said frame location.

23. The apparatus of claim 22 wherein said egress channel further comprises a framing unit that is coupled to an output of said backplane interface, said framing unit to provide said frame location for said selected signal.

24. The apparatus of claim 23 further comprising a line interface unit having an input that is coupled to an output of said framing unit.

25. The apparatus of claim 24 wherein said line interface unit further comprises an optical transmitter.

26. The apparatus of claim 24 wherein said line interface unit has an output coupled to a networking line.

27. The apparatus of claim 23 wherein said signal is an STS-1 signal.

28. The apparatus of claim 23 wherein said signal is an STM-1 signal.

29. The apparatus of claim 23 wherein said backplane is a full mesh backplane.

30. The apparatus of claim 22 further comprising a second line card having a second egress channel with a second backplane interface unit that selects a second signal from said backplane, said second backplane interface unit coupled to a second cross connect table that provides an indication where said second signal may be found on said backplane, said second cross connect table correlating said indication to a second logical label, said second logical label correlated to a location within a second frame that said selected second signal is transmitted within, said logical label having a value that:
   1) will remain fixed over the course of recovery from a degradation or failure event that affects said second signal and
   2) that is reserved for said second frame location so as to identify said second frame location.

31. An apparatus, comprising:
   a switch having a full mesh architecture, said switch further comprising:
   a) a first egress channel having a first backplane selection unit that selects a first signal from a first backplane location for inclusion within a frame that is transmitted upon a first outbound networking line, said first backplane location correlated to a first logical label, said first logical label correlated to a location within said frame that is transmitted upon said first outbound networking line, said logical label having a value:
1) that will remain fixed over the course of recovery from a degradation or failure event that affects said first signal and
2) that is reserved for said location so as to identify said location within said frame that is transmitted upon said first outbound networking line; and, 2) a second egress channel having a second backplane selection unit that selects a second signal from a second backplane location for inclusion within a frame that is transmitted upon a second outbound networking line, said second backplane location correlated to a second logical label, said second logical label correlated to a location within said frame that is transmitted upon said second outbound networking line, said logical label having a value:
1) that will remain fixed over the course of recovery from a degradation or failure event that affects said second signal and
2) that is reserved for said location within said frame that is transmitted upon said second outbound networking line so as to identify said location within said frame that is transmitted upon said second outbound networking line.

32. The apparatus of claim 31 wherein a unique logical label is provided for each signal that is transmitted by said switch.

33. The apparatus of claim 31 wherein a unique logical label is provided for each STS-1 signal that is transmitted by said switch.

34. The apparatus of claim 31 wherein a unique logical label is provided for each STS-1 signal that is transmitted by said switch.

35. The apparatus of claim 31 wherein at least one of said outbound networking lines is a fiber optic cable.

36. The apparatus of claim 31 wherein at least one of said outbound networking lines is an electrical cable.

37. The apparatus of claim 31 further comprising:
a) a first table that provides said correlation between said first backplane location and said first logical label; and,
b) a second table that provides said correlation between said first logical label and said location within said frame that is transmitted upon said first outbound networking line.

38. The apparatus of claim 31 wherein said first egress channel is located on a first line card and said second egress channel is located on a second line card.

39. The apparatus of claim 31 further comprising:
a) a third egress channel having a third backplane selection unit that selects a third signal from a third backplane location, said third egress channel having a path termination unit coupled to an output of said third backplane selection unit so that said path termination unit can receive said third signal.

40. A networking switch, comprising:
a) means for assigning a logical identification label to a location within an outbound frame that transports an egress signal, said logical identification label having a value that: 1) remains fixed over the course of recovery from a degraded or failed line that assists in sourcing said egress signal to said networking switch and 2) uniquely identifies said egress signal;
b) means for assigning a physical identification label to a location on backplane where an ingress signal is found; and,
c) means for configuring a portion of a node's switching fabric by correlating said logical identification label to said physical identification label.

41. The networking switch of claim 40 further comprising means for changing said configuration, if a networking line fails or degrades, by correlating said logical identification label to a second physical identification label.

42. The networking switch of claim 41 wherein said second physical identification label corresponds to a second backplane location where a protection signal for said egress signal is found, said failed or degraded networking line corresponding to a working source for said egress signal.

43. The networking switch of claim 42 wherein each of said signals are STS-1 signals.

44. The networking switch of claim 42 wherein each of said signals are STS-1 signals.

45. The networking switch of claim 41 wherein said second physical identification label corresponds to a second backplane location where a duplicate of a signal upon said filed or degraded networking line is found, said duplicate signal converted to a second egress signal, said failed or degraded networking line and a line over which said second egress signal is transported being part of a 1:N protection group.

* * * * *